No. 672,558. Patented Apr. 23, 1901.
J. N. KAILOR.
CONCAVE.
(Application filed Dec. 13, 1900.)
(No Model.) 2 Sheets—Sheet 1.
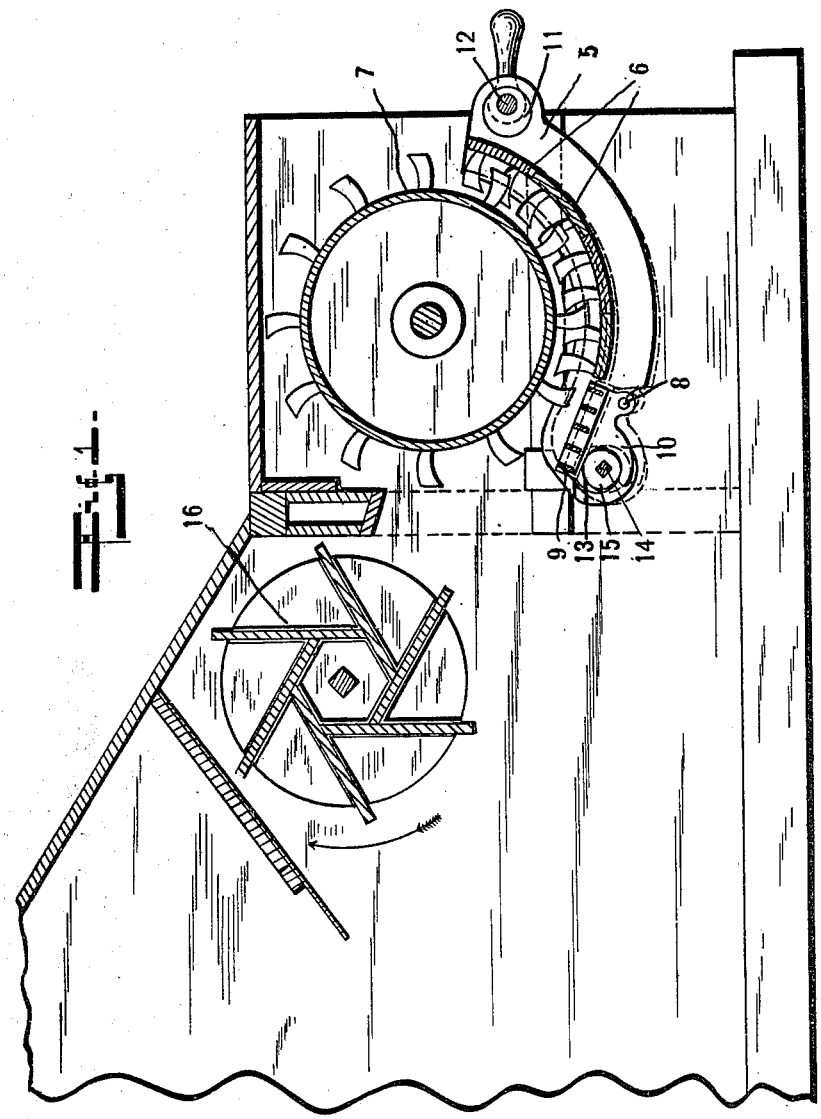

No. 672,558. Patented Apr. 23, 1901.
J. N. KAILOR.
CONCAVE.
(Application filed Dec. 13, 1900.)
(No Model.) 2 Sheets—Sheet 2.
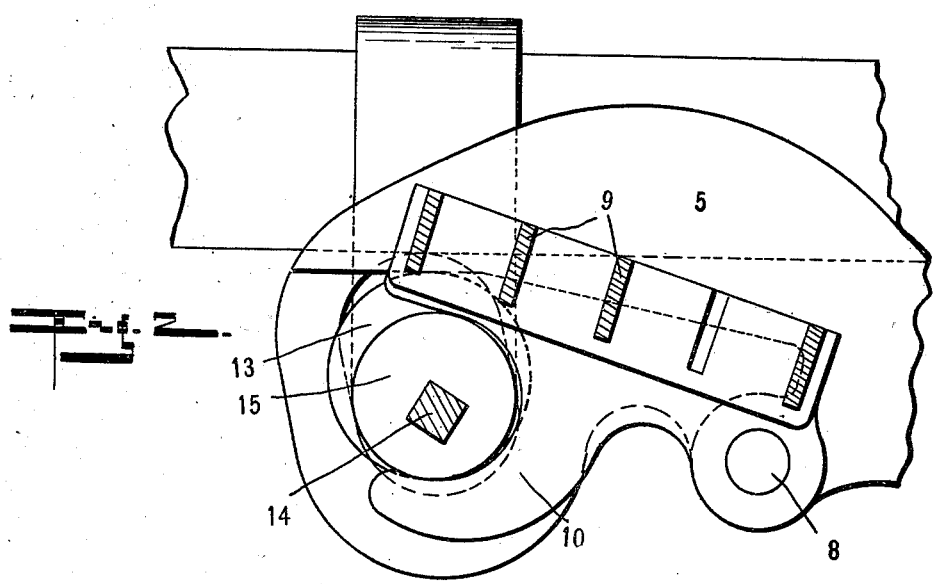
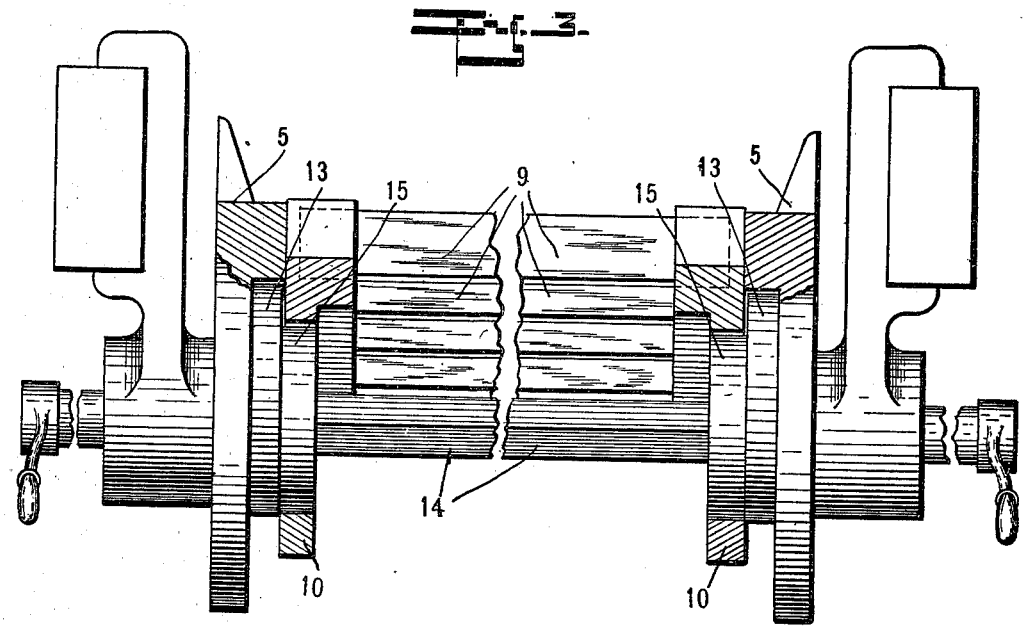
WITNESSES:
INVENTOR
John N. Kailor
BY
Arthur M. Hood
ATTORNEY

UNITED STATES PATENT OFFICE.

JOHN N. KAILOR, OF COLUMBUS, INDIANA, ASSIGNOR TO REEVES AND COMPANY, OF SAME PLACE.

CONCAVE.

SPECIFICATION forming part of Letters Patent No. 672,558, dated April 23, 1901.

Application filed December 13, 1900. Serial No. 39,608. (No model.)

*To all whom it may concern:*

Be it known that I, JOHN N. KAILOR, a citizen of the United States, residing at Columbus, in the county of Bartholomew and State of Indiana, have invented a new and useful Concave, of which the following is a specification.

My invention relates to an improvement in a grating extension for concaves of separators.

In concaves as now constructed provision is made to adjust the concave toward and from the cylinder; but in so doing the direction of discharge of grain and straw from the concave is changed, so as to at times render ineffectual the beater usually mounted in position to check the grain and prevent its immediate passage too far into the casing.

The object of my present invention is to produce an improved grating to be mounted at the rear of the concave with means for shifting the position thereof relative to the concave.

The accompanying drawings illustrate my invention.

Figure 1 is a transverse section of my improved concave, together with the adjacent cylinder and beater. Fig. 2 is an enlarged section of the grating and adjacent portion of the concave-support. Fig. 3 is a section on line 3 3 of Fig. 2.

In the drawings, 5 5 indicate the two usual concave-supports, between which are secured in any desired manner the usual concave-sections 6, carrying teeth which coöperate in the usual manner with the teeth of the cylinder 7. Pivoted on an axis 8 immediately in front of the last concave-section and extending between the supports 5 is a grating 9, provided upon its under side with a yoke 10. The rear ends of the concave-supports 5 may be supported in any desired manner, said support being shown in the present case as consisting of one or more cams 11, carried by the transverse shaft 12. The forward end of each support 5 is supported upon a cam 13, carried by a transverse shaft 14. Mounted upon shaft 14 in position to lie within and engage yoke 10 is a cam 15, which cam is of a different throw from cam 13, as shown.

The operation is as follows: By turning shaft 14 grating 9 is given a movement about its pivot 8 such that no matter what the position of the concave-support may be the upper surface of the grating will lie in a plane which, if continued, would always strike the arms of beater 16. By this means the concave cannot be so adjusted as to make possible a position of its inner or grating end such that grain thrown therefrom will pass beneath the beater.

I claim as my invention—

1. The combination with a concave, of a shaft, a cam operated by said shaft and arranged to engage the forward end of said concave, a grating carried by the forward end of said concave and relatively movable thereon, and a cam operated by said shaft in position to engage and move said grating.

2. The combination with a concave, of a shaft, a cam operated by said shaft and arranged to engage the forward end of said concave, a grating pivotally mounted upon the forward end of said concave, and a cam operated by said shaft in position to engage and swing said grating.

3. The combination with a concave, of a grating movably mounted thereon, and means engaging both the concave and grating for simultaneously adjusting the concave and adjusting the grating upon the concave.

4. The combination with a concave, of a grating pivotally mounted upon the forward end thereof, and means engaging both the concave and grating for simultaneously adjusting the concave and swinging the grating upon the concave.

JOHN N. KAILOR.

Witnesses:
M. T. REEVES,
E. WYNEGAR.